(12) United States Patent
Pereira et al.

(10) Patent No.: US 12,576,967 B2
(45) Date of Patent: Mar. 17, 2026

(54) SOLENOID ACTUATED SEMI-AUTOMATIC AUXILIARY GUIDE ASSEMBLY

(71) Applicant: GOODRICH CORPORATION, Charlotte, NC (US)

(72) Inventors: Elvis Jack Pereira, Bangalore (IN); Sayooj Adavalath Puthiyaveettil, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 334 days.

(21) Appl. No.: 18/333,170

(22) Filed: Jun. 12, 2023

(65) Prior Publication Data

US 2024/0317400 A1 Sep. 26, 2024

(30) Foreign Application Priority Data

Mar. 29, 2023 (IN) .............................. 202341023270

(51) Int. Cl.
| | |
|---|---|
| *B64D 9/00* | (2006.01) |
| *H01F 7/08* | (2006.01) |
| *H01F 7/16* | (2006.01) |

(52) U.S. Cl.
CPC ............... *B64D 9/00* (2013.01); *H01F 7/081* (2013.01); *H01F 7/16* (2013.01)

(58) Field of Classification Search
CPC ..... B64D 9/003; B64D 2009/006; B60P 7/06; B60P 7/08; B60P 7/13
USPC .......................................................... 410/77
See application file for complete search history.

(56) References Cited

U.S. PATENT DOCUMENTS

| | | | | |
|---|---|---|---|---|
| 3,712,454 | A | * | 1/1973 | McKee ................ B65G 13/065 |
| | | | | 198/782 |
| 3,927,622 | A | * | 12/1975 | Voigt ..................... B64D 9/003 |
| | | | | 410/79 |
| 4,415,298 | A | * | 11/1983 | Voigt ........................ B60P 7/13 |
| | | | | 410/77 |
| 4,426,051 | A | * | 1/1984 | Banks ...................... B64D 1/10 |
| | | | | 410/101 |
| 9,630,545 | B1 | | 4/2017 | Corrigan et al. |
| 10,392,111 | B2 | | 8/2019 | Jayaprakash et al. |
| 2005/0008443 | A1 | * | 1/2005 | Eitzenberger ............. B60P 7/13 |
| | | | | 410/94 |
| 2005/0019125 | A1 | * | 1/2005 | Panzarella .............. B60P 3/073 |
| | | | | 410/7 |
| 2021/0046860 | A1 | | 2/2021 | Lee et al. |

FOREIGN PATENT DOCUMENTS

| | | |
|---|---|---|
| CA | 1138831 | 1/1983 |

OTHER PUBLICATIONS

European Patent Office, European Search Report dated Aug. 6, 2024 in Application No. 24166386.3.
European Patent Office, European Office Action dated Oct. 21, 2025 in Application No. 24166386.3.

* cited by examiner

*Primary Examiner* — Hilary L Gutman
(74) *Attorney, Agent, or Firm* — SNELL & WILMER L.L.P.

(57) ABSTRACT

An auxiliary guide assembly may include a hub, a head including a first guiding surface and a first overriding surface, the head rotatably coupled to the hub, a solenoid coupled to the hub and configured to receive an electric current, and an armature magnetically coupled to the solenoid, the armature being configured to engage the head when in the armature is an extended position.

7 Claims, 7 Drawing Sheets

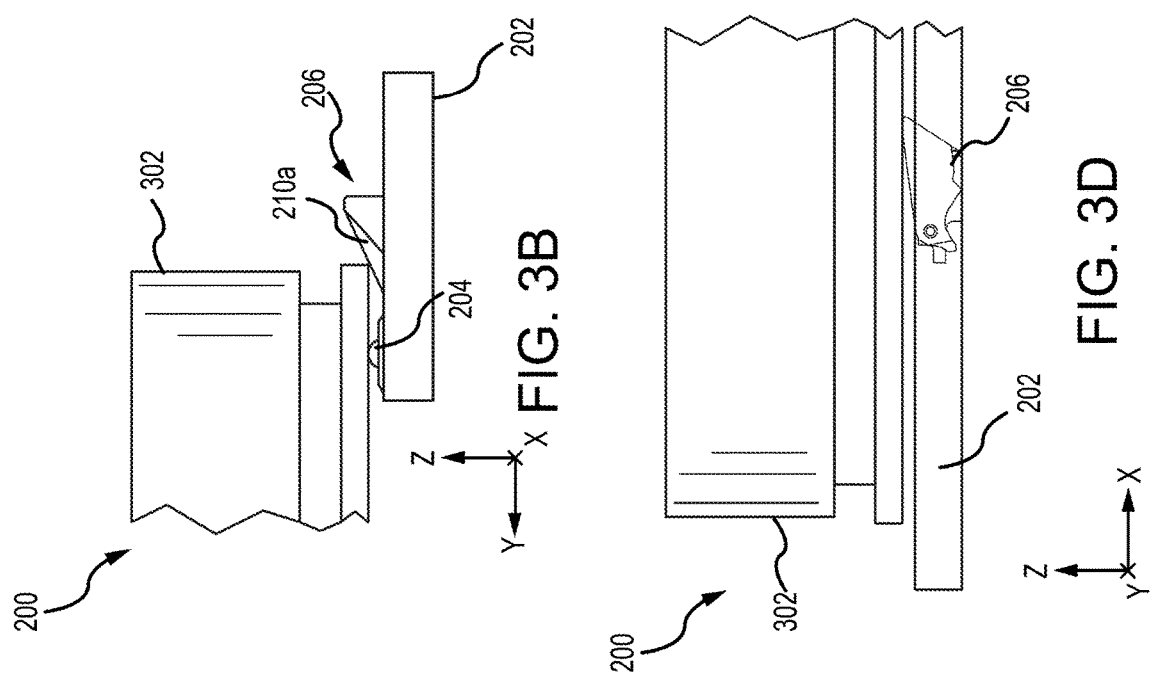
FIG. 3A
FIG. 3B
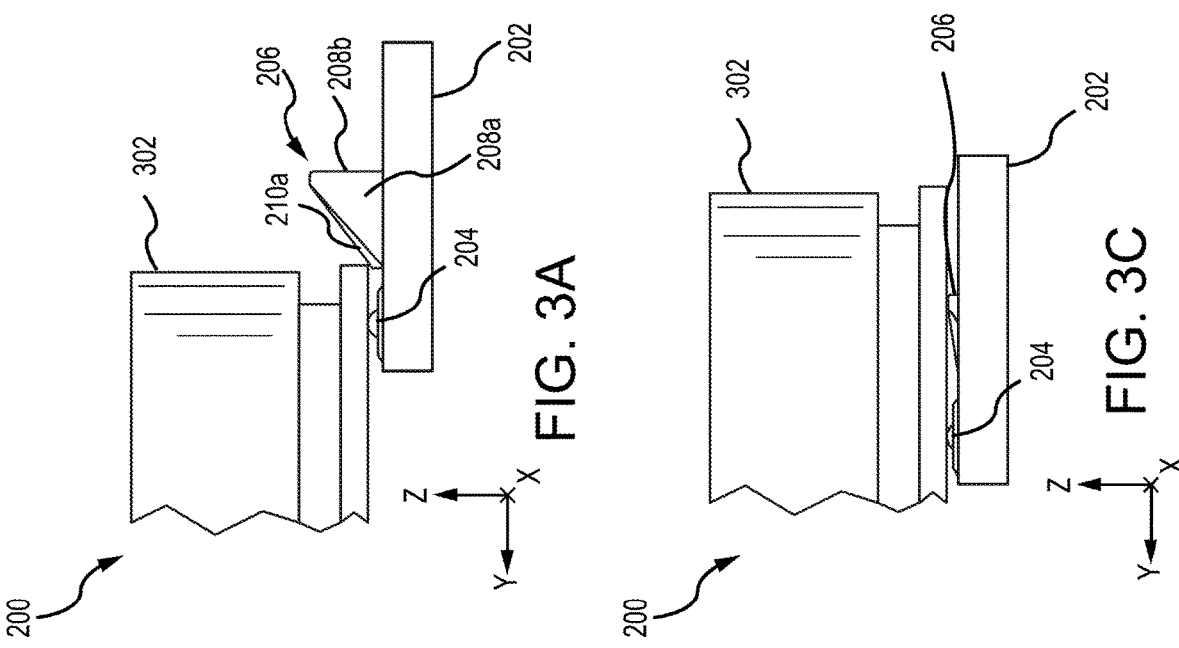
FIG. 3C
FIG. 3D

SOLENOID ACTUATED SEMI-AUTOMATIC AUXILIARY GUIDE ASSEMBLY

CROSS-REFERENCE TO RELATED APPLICATIONS

This application claims priority to, and the benefit of, India Provisional Patent Application No. 202341023270, filed Mar. 21, 2023 (DAS Code 89DC) and titled "SOLENOID ACTUATED SEMI-AUTOMATIC AUXILIARY GUIDE ASSEMBLY," which is incorporated by reference herein in its entirety for all purposes.

FIELD

The present disclosure generally relates to cargo guide assemblies, and more specifically, to semi-automatic auxiliary guide assemblies.

BACKGROUND

Auxiliary guides are used in air cargo compartments with the cargo surface, such as a ball panel, near the cargo loading door of an aircraft. Auxiliary guides aid in guiding and stopping unit load devices (ULDs) in the cargo compartment. To accomplish this, auxiliary guides generally have two guiding surfaces in a longitudinal direction of the aircraft and two overriding surfaces in a lateral direction of the aircraft. The auxiliary guides are manually engaged and disengaged.

SUMMARY

An auxiliary guide assembly is disclosed herein. The auxiliary guide assembly includes a hub, a head including a first guiding surface and a first overriding surface, the head rotatably coupled to the hub, a solenoid coupled to the hub and configured to receive an electric current, and an armature magnetically coupled to the solenoid, the armature being configured to engage the head when in the armature is an extended position.

In various embodiments, the solenoid of the auxiliary guide assembly generates a magnetic field in response to receiving the electric current, the magnetic field attracting the armature, causing the armature to disengage with the head. In various embodiments, the auxiliary guide assembly further includes a torsion spring coupled to the hub and configured to raise the head in response to the armature being disengaged from the head. In various embodiments, the auxiliary guide assembly further includes an inner spring disposed between the solenoid and the armature, the inner spring configured to apply a force to maintain the armature in the extended position.

In various embodiments, the auxiliary guide assembly further includes a battery coupled to the solenoid, the battery providing the electric current. In various embodiments, the solenoid receives the electric current from a cargo handling system. In various embodiments, the head further includes an indent configured to receive the armature.

Also disclosed herein is a cargo handling system including a ball panel for moving and storing cargo and an auxiliary guide assembly disposed within the ball panel. The auxiliary guide assembly includes a hub, a head including a first guiding surface and a first overriding surface, the head rotatably coupled to the hub, a solenoid coupled to the hub and configured to receive an electric current, and an armature magnetically coupled to the solenoid, the armature being configured to engage the head when in the armature is an extended position.

In various embodiments, the solenoid of the cargo handling system generates a magnetic field in response to receiving the electric current, the magnetic field attracting the armature, causing the armature to disengage with the head. In various embodiments, the auxiliary guide assembly includes a torsion spring coupled to the hub and configured to raise the head when the armature is disengaged from the head. In various embodiments, the auxiliary guide assembly further includes an inner spring disposed between the solenoid and the armature, the inner spring configured to apply a force to maintain the armature in the extended position.

In various embodiments, the cargo handling system further includes a battery coupled to the solenoid, the battery providing the electric current. In various embodiments, the cargo handling system further includes a controller connected to the auxiliary guide assembly, the controller configured to apply the electric current. In various embodiments, the controller is further configured to apply the electric current in response to an instruction received from a user interface.

Also disclosed herein is a system including a ball panel, a first auxiliary guide assembly disposed in the ball panel, a user interface, a processor operatively connected to the first auxiliary guide assembly and to the user interface, and a memory operatively coupled to the processor. The memory includes instructions stored thereon that, when executed by the processor, cause the processor to receive a first instruction from the user interface, the first instruction identifying the first auxiliary guide assembly and send a first electric current to the first auxiliary guide assembly to engage the first auxiliary guide assembly in response to receiving the first instruction.

In various embodiments, the first auxiliary guide assembly includes a hub, a head including a first guiding surface and a first overriding surface, the head rotatably coupled to the hub, a solenoid coupled to the hub and configured to receive the first electric current, and an armature magnetically coupled to the solenoid, the armature being configured to engage the head in response to the armature being in an extended position. In various embodiments, the solenoid generates a magnetic field in response to receiving the first electric current, the magnetic field attracting the armature, causing the armature to disengage with the head.

In various embodiments, the first auxiliary guide assembly further includes a torsion spring coupled to the hub and configured to raise the head when the armature is disengaged from the head and an inner spring disposed between the solenoid and the armature, the inner spring configured to apply a force to maintain the armature in the extended position. In various embodiments, the system further includes a second auxiliary guide assembly disposed in the ball panel and the processor is operatively coupled to the second auxiliary guide assembly. The instructions, when executed by the processor, further cause the processor to receive a second instruction from the user interface, the second instruction identifying the second auxiliary guide assembly and send a second electric current to the second auxiliary guide assembly to engage the second auxiliary guide assembly in response to receiving the second instruction.

In various embodiments, the instructions, when executed by the processor, further cause the processor to receive a third instruction from the user interface, the third instruction identifying the first auxiliary guide assembly and the second auxiliary guide assembly and stop the first electric current and the second electric current in response to receiving the third instruction.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A, 3B, 3C, and 3D illustrate a cargo handling system including an auxiliary guide assembly guiding a unit load device, in accordance with various embodiments.

DETAILED DESCRIPTION

Figure 1:
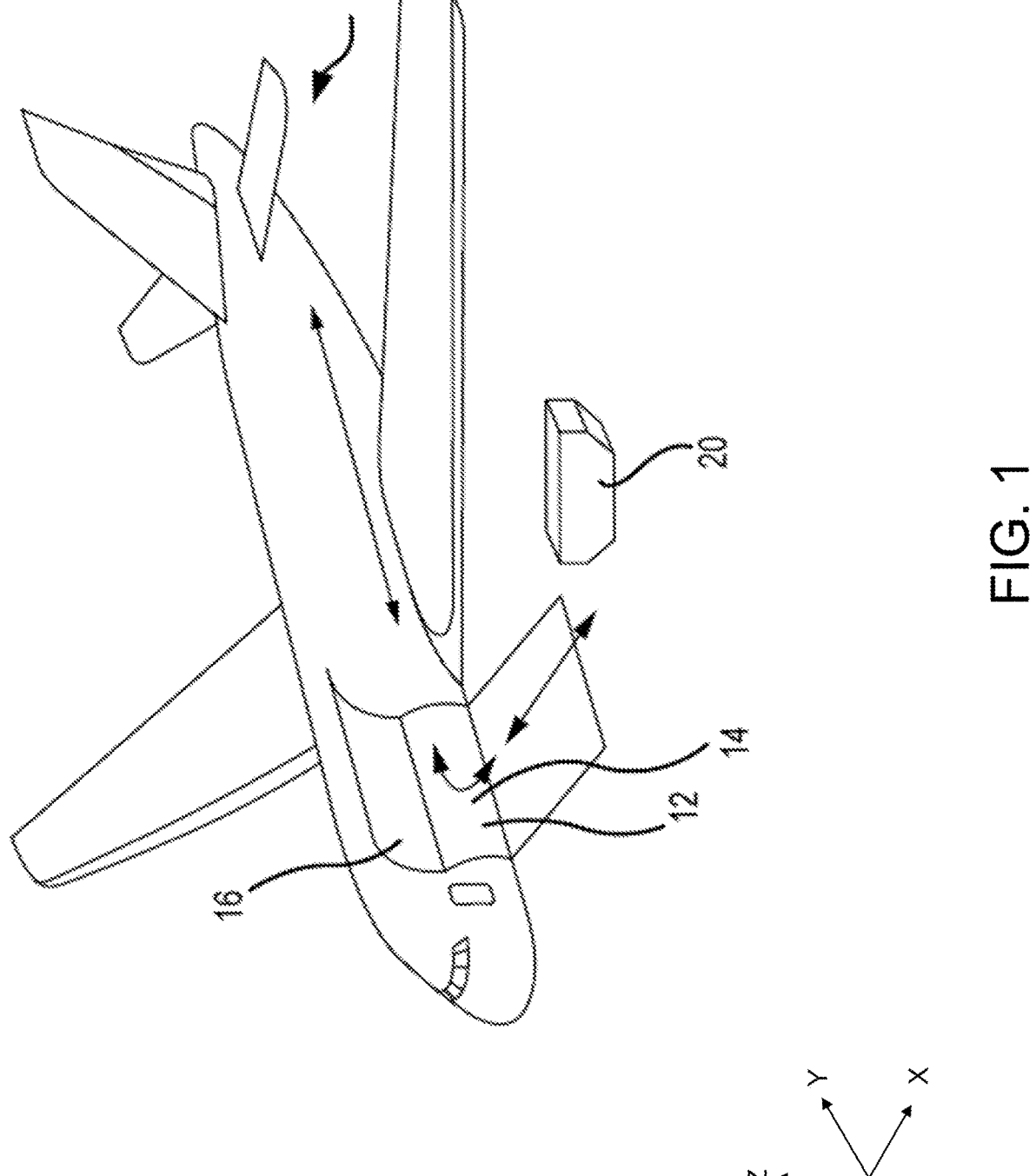
FIG. 1 illustrates a schematic of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an auxiliary guide assembly for use with cargo handling systems. The auxiliary guide assembly, in various embodiments, includes an upper portion that is coupled to a lower portion. The upper portion, in various embodiments, is configured to rotate with respect to the lower portion between an extended position and a fully retracted position. The upper portion, in various embodiments, includes two guiding surfaces and two overriding surfaces in a longitudinal direction and in a lateral direction. The lower portion, in various embodiments, includes a solenoid and an armature configured to facilitate remote operation of the auxiliary guide assembly.

In various embodiments, the armature engages the upper portion to secure the upper portion in the fully retracted position. In various embodiments, the solenoid, when energized, attracts the armature, causing the armature to disengage with the upper portion, allowing the upper portion to move to the extended position. In various embodiments, at least one of the two guiding surfaces of the auxiliary guide assembly guides cargo moving in a first direction. In various embodiments, at least one of the two overriding surfaces of the auxiliary guide assembly allows the cargo to partially retract the auxiliary guide assembly so that the cargo may pass over top of the auxiliary guide assembly. The auxiliary guide assembly may return to the extended position after the cargo has passed. In various embodiments, a controller may control one or more of the auxiliary guide assemblies, and more specifically, the solenoid of the one or more auxiliary guide assemblies.

In various embodiments, the auxiliary guide assembly disclosed herein may reduce operation times by allowing users to remotely unlock, or extend, each auxiliary guides assembly as opposed to manually extending each auxiliary guide assembly. In various embodiments, the auxiliary guide assembly may be operated at various different voltages, including 12 volts, 18 volts, and 24 volts, among others. In various embodiments, the auxiliary guide assembly may be operated at different electric currents such as about 1 amp to about 5 amps, among others. In various embodiments, the auxiliary guide assembly may be battery operated. In various embodiments, the auxiliary guide assembly may be powered by the aircraft or cargo handling system. In various embodiments, the auxiliary guide assembly may be manually operated in the case of power loss.

Referring now to FIG. 1, in accordance with various embodiments, a perspective view of an aircraft 10 is illustrated. Aircraft 10 includes a cargo deck 12 located within a cargo compartment 14. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. A "ULD", as used herein, includes a container, pallet, or other cargo of any size, shape, configuration, and/or type. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. As illustrated, ULD 20 is loaded laterally (e.g., the negative y-direction) into cargo compartment 14. Once inside aircraft 10, ULD 20 may be moved longitudinally (e.g., the x-direction) cargo compartment 14 to a final stowed position. Straps may be used to secure ULD 20 in the final stowed position to tend to minimize, or prevent, movement of ULD 20 during transport. Multiple ULDs may be brought on-board aircraft 10, with each ULD 20 being placed in a respective stowed position on cargo deck 12. One or more final ULDs 20 may be loaded laterally into cargo compartment 14 but not moved longitudinally within cargo compartment 14. After aircraft 10 has reached its destination, each ULD 20 is unloaded from aircraft 10 in similar fashion, but in reverse sequence to the loading procedure. To facilitate movement of ULD 20 along the cargo deck 12, aircraft 10 may include a cargo handling system as described herein in accordance with various embodiments.

Figures 2A, 2B:
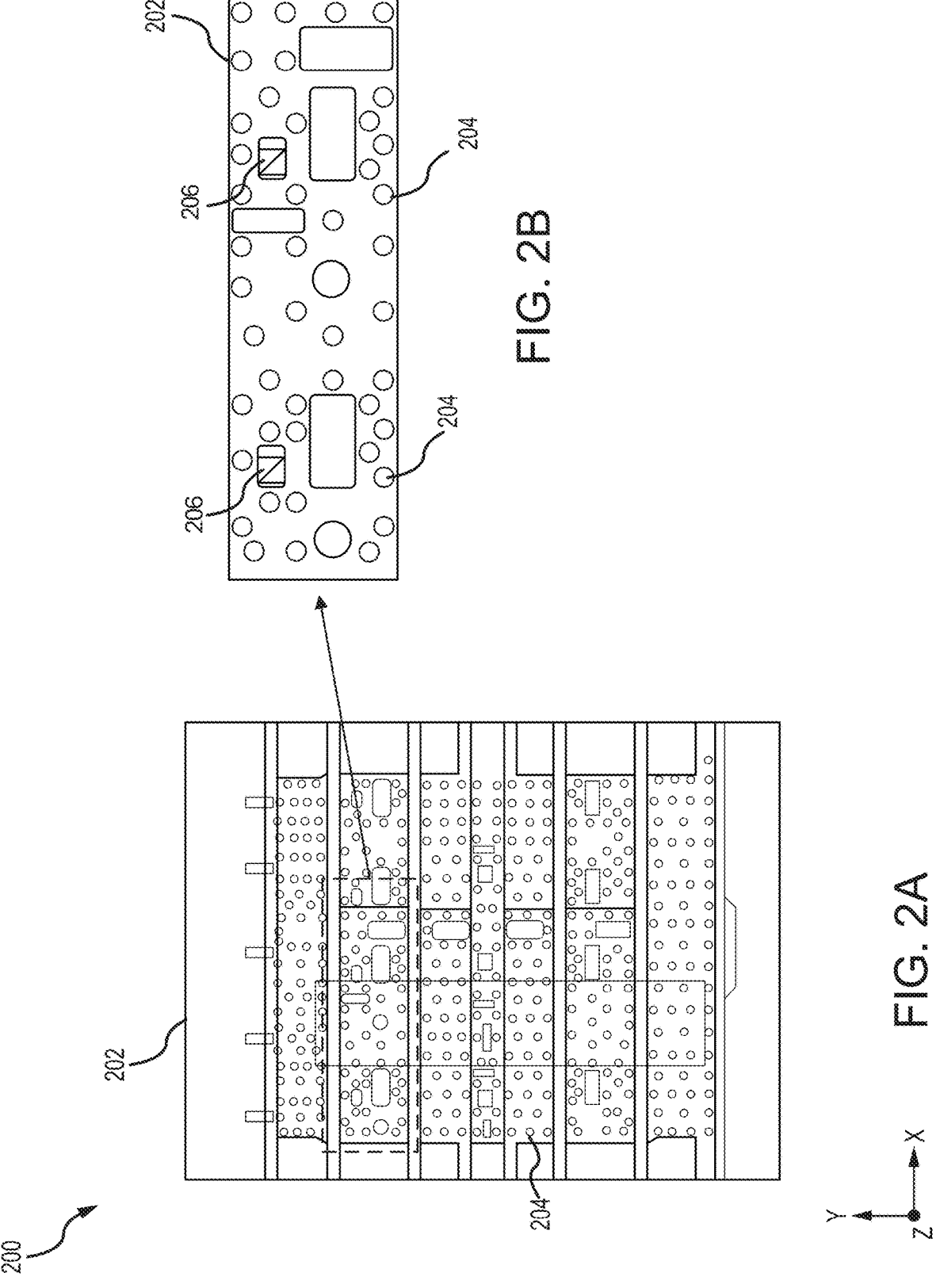
FIGS. 2A and 2B illustrate a cargo handling system including auxiliary guide assemblies, in accordance with various embodiments.

Referring now to FIGS. 2A-2B, in accordance with various embodiments, a cargo handling system 200 is illustrated. FIGS. 2A and 2B are a top-down views of cargo handling system 200. Cargo handling system 200 includes a ball panel 202 having a plurality of omni-directional rollers 204 and one or more auxiliary guide assemblies 206. Ball panel 202 may be located in cargo compartment 14, such as within the opening created by cargo load door 16. Ball panel 202 is configured to receive cargo (e.g., ULD 20) laterally within aircraft 10 (e.g., the negative x-direction) and move the cargo (e.g., ULD 20) longitudinally (e.g., the y-direction) within cargo compartment 14. Omni-directional roller 204 allows the cargo to move both laterally and longitudinally. That is, omni-directional roller 204 includes a ball that rotates as the cargo moves over top of the ball. In various embodiments, cargo handling system 200 may further include one or more power drive units (PDUs) configured to move the cargo along ball panel 202. For example, one or more PDUs may be configured to move the cargo laterally along ball panel 202 and one or more different PDUs may be configured to move the cargo longitudinally over ball panel 202.

Auxiliary guide assembly 206 is disposed in ball panel 202 and is configured to guide the cargo (e.g., ULD 20) as moves with cargo compartment 14. Auxiliary guide assembly 206 is configured to retract into (e.g., in the negative z-direction) ball panel 202 and extend out (e.g., in the positive z-direction) ball panel 202. Auxiliary guide assembly 206 may fully retract into ball panel 202 in response to a first force (e.g., worker pushing down) and be locked in the retracted position. Auxiliary guide assembly 206 includes a locking mechanism that secures auxiliary guide assembly 206 in the fully retracted position until the locking mechanism is disengaged. In addition or in the alternative, auxiliary guide assembly 206 may partially retract into ball panel 202 in response to a second force (e.g., ULD 20) such that it automatically extends above ball panel 202 after the force is removed. Auxiliary guide assembly 206 includes springs configured to extend auxiliary guide assembly 206 out ball panel 202 from the partially retracted state in the absence of the second force. That is, auxiliary guide assembly 206 is generally extended out ball panel 202. Auxiliary guide assembly 206 includes two guiding surfaces and two overriding surfaces. A first guiding surface is configured to prevent movement of the cargo in a first direction (e.g., the positive x-direction) and guide the cargo longitudinally (e.g., along the y-axis) within cargo compartment 14. A second guiding surface is configured to prevent movement of the cargo in a second direction (e.g., the positive y-direction) and guide the cargo laterally (e.g., along the x-axis) within cargo compartment. A first override surface is configured to partially retract auxiliary guide assembly 206 in response to the cargo moving in a third direction (e.g., the negative y-direction). A second override surface is configured to partially retract auxiliary guide assembly 206 in response to the cargo moving in a fourth direction (e.g., the negative x-direction).

As illustrated in FIGS. 2A and 2B, ball panel 202 is configured to receive the cargo from the right side (e.g., the positive x-direction) into cargo compartment 14. The cargo moves into cargo compartment 14 in the fourth direction (e.g., laterally, in the negative x-direction) and engages first override surface of auxiliary guide assembly 206. Auxiliary guide assembly 206 partially retracts into ball panel 202 in response to the cargo engaging first override surface. Auxiliary guide assembly 206 extends out of ball panel 202 after the cargo is passed, allowing auxiliary guide assembly 206 to guide the cargo longitudinally (e.g., along the y-axis) should the cargo engage the first guiding surface of auxiliary guide assembly.

Referring now to FIGS. 3A-3D, a cargo handling system 200 including an auxiliary guide assembly 206 guiding a piece of cargo 302 is illustrated, in accordance with various embodiments. In various embodiments, cargo 302 may be a unit load device (ULD) such as ULD 20 described above with respect to FIG. 1. In various embodiments, cargo 302 may be a pallet or other type of cargo. As described above, auxiliary guide assembly 206 includes a first guiding surface 208a, a second guiding surface 208b, a first overriding surface 210a, and a second overriding surface. First guiding surface 208a is configured to guide prevent cargo 302 from moving in the first direction (e.g., the positive x-direction) and guide cargo 302 longitudinally (e.g., along the y-axis) within an aircraft (e.g., aircraft 10). Second guiding surface 208b is configured to prevent cargo 302 from moving in the second direction (e.g., the positive y-direction) and guide cargo 302 laterally (e.g., along the x-axis) within the aircraft. first overriding surface 210a is configured to allow cargo 302 to move in the third direction (e.g., the negative y-direction) by partially retracting auxiliary guide assembly (e.g., in the negative z-direction) into ball panel 202 in response to cargo 302 engaging first override surface in the third direction. Second override surface is configured to allow cargo 302 to move in the fourth direction (e.g., the negative x-direction) by partially retracting auxiliary guide assembly into ball panel 202 in response to cargo 302 engaging second override surface in the fourth direction.

FIG. 3A illustrates cargo 302 engaging first overriding surface 210a in the third direction (e.g., the negative y-direction). Cargo 302 rolls over omni-directional roller 204 and engages first overriding surface 210a of auxiliary guide assembly 206. first overriding surface 210a has an upward extending slope (e.g., in the positive z-direction) in the longitudinal direction (e.g., in the negative y-direction) that allows cargo 302 to move onto first overriding surface 210a that causes auxiliary guide assembly 206 to partially retract into ball panel 202. FIG. 3B illustrates cargo 302 moving onto first overriding surface 210a with auxiliary guide assembly 206 retracting into ball panel 202. FIG. 3C illustrates cargo 302 over top of auxiliary guide assembly 206 that is partially retracted into ball panel 202. FIG. 3D illustrated different view of auxiliary guide assembly partially retracted into ball panel 202.

Figure 4B:
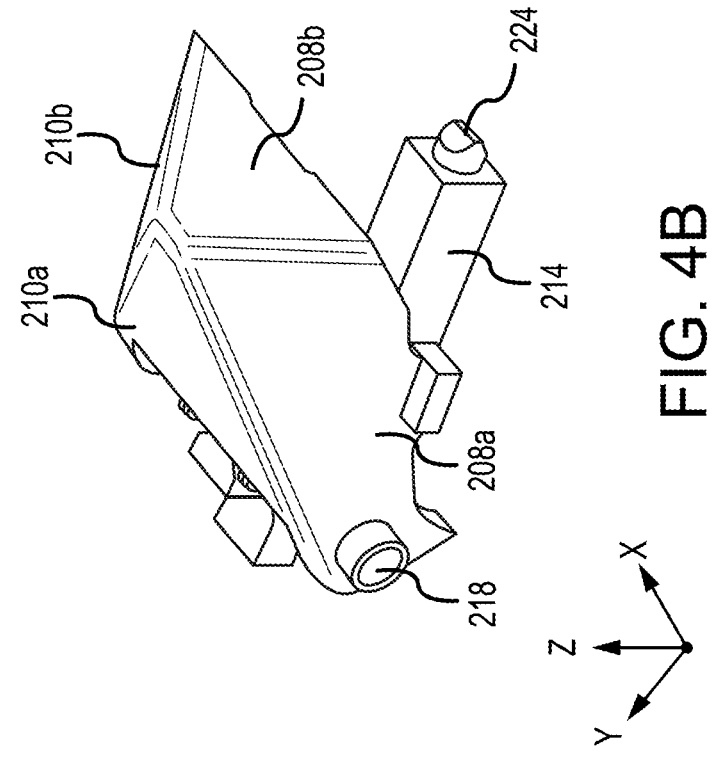
FIGS. 4A, 4B, 4C, and 4D illustrate an auxiliary guide assembly, in accordance with various embodiments.
Figure 4A:
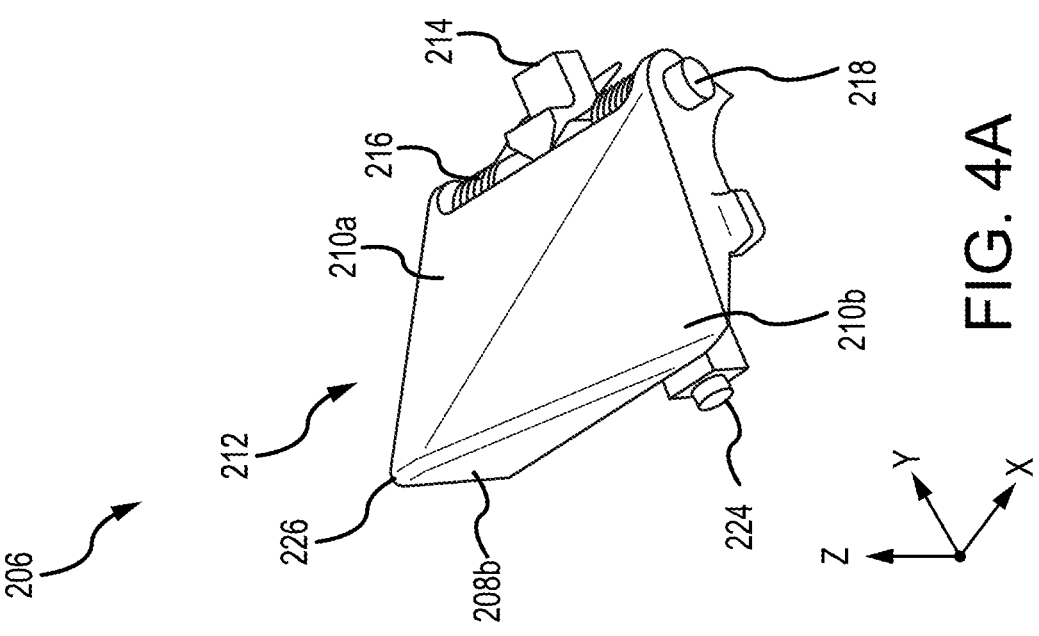

Referring now to FIGS. 4A-4D, an auxiliary guide assembly 206 is illustrated, in accordance with various embodiments. FIG. 4A illustrates a perspective side view of auxiliary guide assembly 206 in which first overriding surface 210a and second overriding surface 210b are visible. FIG.

Figure 4C:
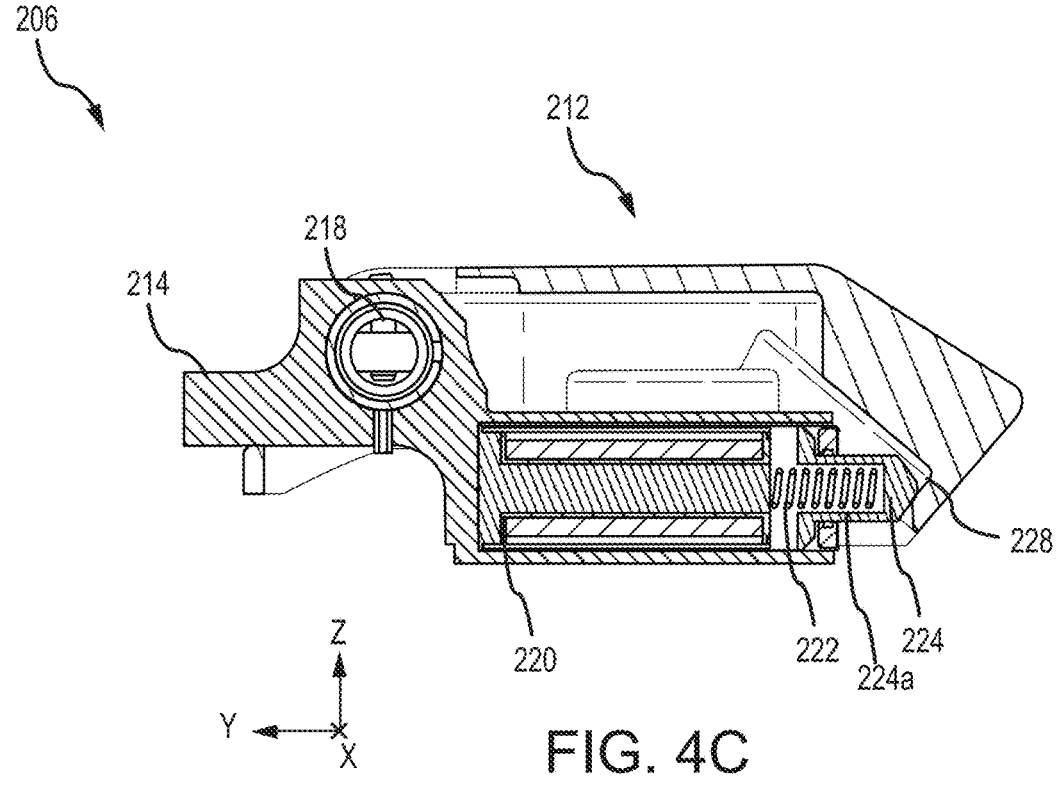
Figure 4D:
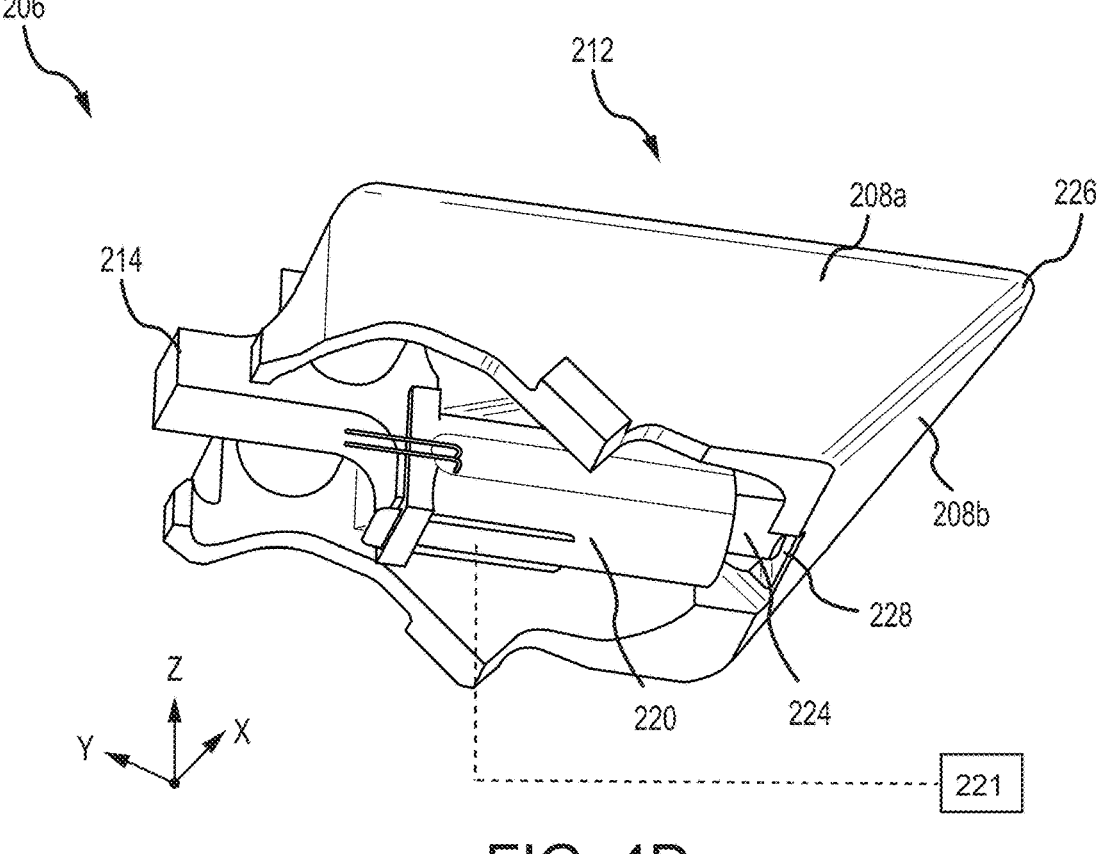

4B illustrates a perspective side view of auxiliary guide assembly 206 in which first guiding surface 208a and second guiding surface 208b are visible. FIG. 4C illustrates a cross section of auxiliary guide assembly 206. FIG. 4D illustrates a perspective bottom view of auxiliary guide assembly 206.

Auxiliary guide assembly 206 further includes a head 212, a hub 214, a torsion spring 216, a pin 218, a solenoid 220, an inner spring 222, and an armature 224. Head 212 is coupled to hub 214 by pin 218 and is configured to rotate with respect to hub 214. That is, hub 214 may be secured to ball panel 202 and head 212 extends up from (e.g., in the positive z-direction) ball panel 202 and retracts into (e.g., the negative z-direction) ball panel 202. Head 212 includes first guiding surface 208a, second guiding surface 208b, first overriding surface 210a, and second overriding surface 210b that come together to form a point 226. Head 212 further includes an indent 228 that is configured to receive armature 224 to secure auxiliary guide assembly 206 in the fully retracted position. In various embodiments, a plunger that extends into solenoid 220 may be used instead of armature 224. However, armature 224 will be used for simplicity in the discussion below.

Torsion spring 216 is coupled to hub 214 and is configured to apply an upward (e.g., in the positive z-direction) force to head 212 to extend head 212 above ball panel 202. In various embodiments, pin 218 is disposed through torsion spring 216, coupling head 212 to hub 214 and securing torsion spring 216 in position to apply the upward force.

Solenoid 220 is located inside hub 214 and is adjacent inner spring 222 and armature 224. Armature 224 extends outward (e.g., in the negative y-direction) from hub 214 and is configured to engage indent 228 of head 212 when in an extended position. Inner spring 222 has a first end adjacent solenoid 220 and a second end that is configured to slide into an inner cavity 224a of armature 224. Solenoid 220 generates a magnetic field in response to receiving an electric current from a power source. In various embodiments, the power source may be from the aircraft (e.g., aircraft 10). In various embodiments, the power source may be a battery 221. In various embodiments, the battery 221 may be located adjacent auxiliary guide assembly 206. In various embodiments, the battery 221 may be located a distance away from auxiliary guide assembly 206.

Solenoid 220, when energized (e.g., generating the magnetic field), attracts armature 224 (e.g., in the positive y-direction) toward solenoid 220, compressing inner spring 222, and disengaging with indent 228. Torsion spring 216 extends head 212 upward (e.g., in the positive z-direction) in response to armature 224 retracting and disengaging from indent 228. Solenoid, when not energized (e.g., not generating the magnetic field), releases armature 224 allowing inner spring 222 to move armature 224 away from (e.g., in the negative y-direction) solenoid 220.

Accordingly, disclosed herein is auxiliary guide assembly 206 that may be fully retracted manually and extended automatically in response to an electric current (e.g., solenoid 220 being energized). In various embodiments, auxiliary guide assembly 206 may be manually extended in the event of a power failure or other causes. A user may lift head 212 (e.g., in the positive z-direction) by pulling on head 212 at point 226 causing armature 224 to disengage with head 212, and more specifically, with indent 228.

Figures 5A, 5B, 5C:
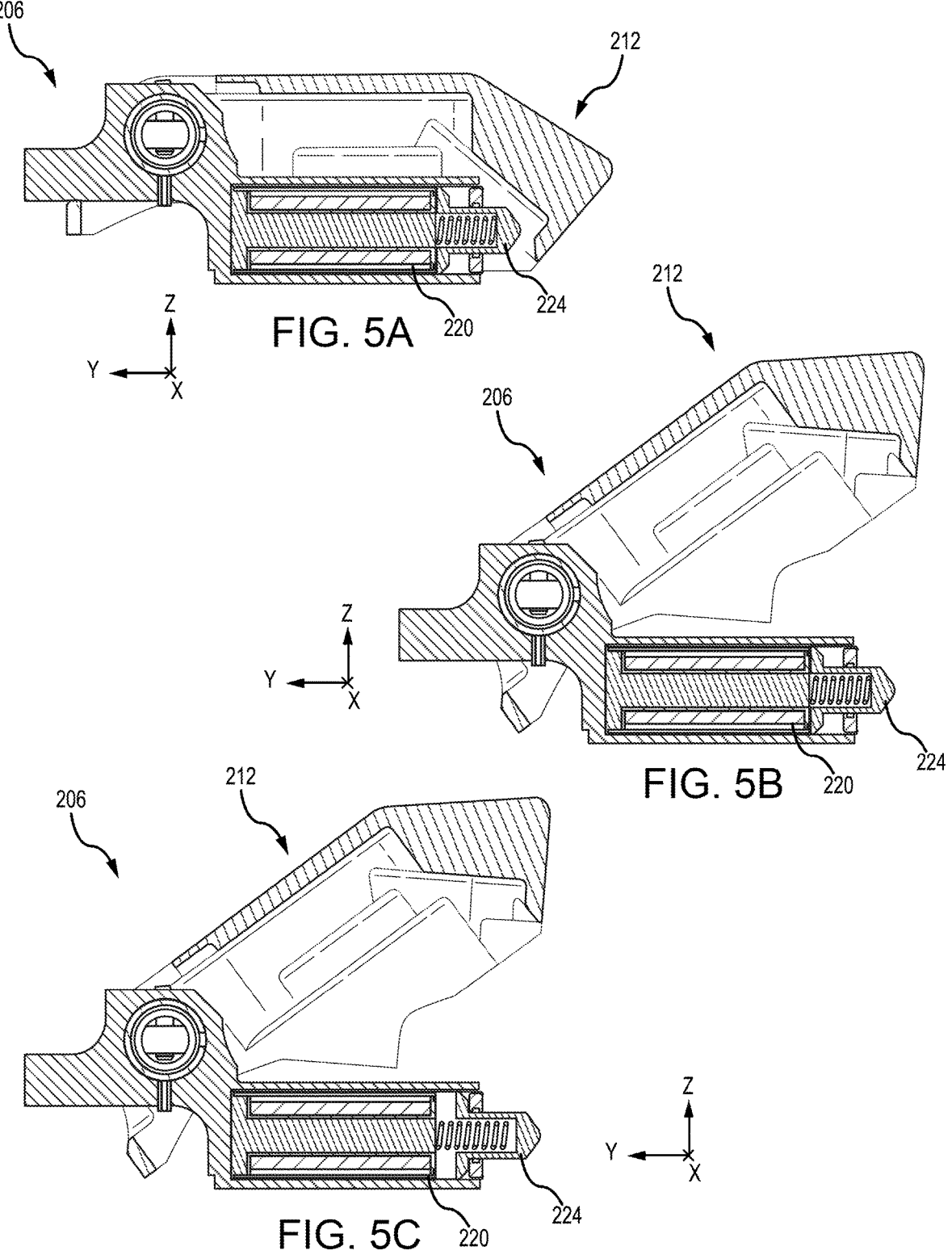
FIGS. 5A, 5B, and 5C illustrate the operation of an auxiliary guide assembly, in accordance with various embodiments.

Referring now to FIGS. 5A-5C, cross section views of auxiliary guide assembly 206 in various states of use are illustrated, in accordance with various embodiments. FIG. 5A illustrates auxiliary guide assembly 206 in a fully retracted state at the moment that solenoid 220 is energized (e.g., receives an electric current). Head 212 is fully retracted and armature 224 is attracted to solenoid 220 (e.g., in the negative y-direction). FIG. 5B illustrates head 212 extended in response to armature 224 being retracted. FIG. 5C illustrated head 212 extended and solenoid 220 deenergized (e.g., the electric current is removed) so that armature 224 is extended (e.g., in the negative y-direction). Auxiliary guide assembly 206 may be used in typical operations in the states illustrated in FIG. 5B and FIG. 5C. In various embodiments, during cargo loading operations solenoid 220 may be energized so that head 212 does not lock when head 212 is fully retracted or partially retracted. In various embodiments, during cargo loading operations solenoid 220 may be deenergized. In these embodiments, the cargo typically causes head 212 to partially retract in which case head 212 does not engage armature 224. Therefore, head 212 does not lock in the retracted position. However, should a user fully retract head 212, head 212 may engage armature 224 and remain in the fully retracted position.

Figure 6:
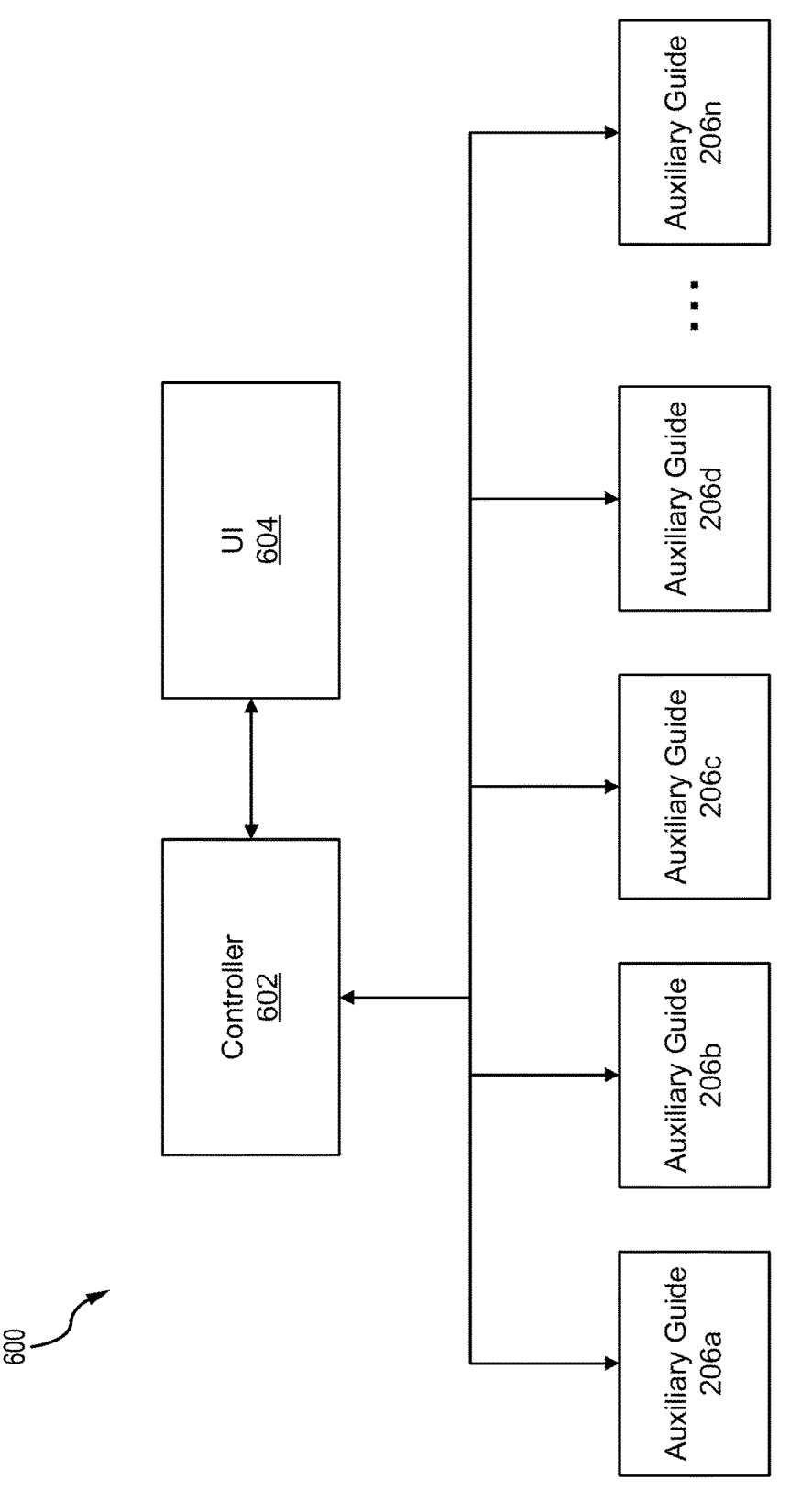
FIG. 6 illustrates a system for controlling a plurality of auxiliary guide assemblies, in accordance with various embodiments.

Referring to FIG. 6, a system 600 for controlling a plurality of auxiliary guide assemblies 206 is illustrated, in accordance with various embodiments. System 600 includes a controller 602, a user interface (UI) 604, and a plurality of auxiliary guide assemblies 206a, 206b, 206c, 206d, . . . , 206n, collectively referred to herein as auxiliary assemblies 206. In various embodiments, UI 604 may be a central computer running a program to control a cargo handling system (e.g., cargo handling system 200), including the plurality of auxiliary guide assemblies 206. In various embodiments, UI 604 may be a tablet, a phone, or a remote control, among other interfaces, for controlling the plurality of auxiliary guide assemblies 206 in the cargo handling system.

Controller 602 may be operatively coupled to UI 604 and to the plurality of auxiliary guide assemblies 206. In various embodiments, controller 602 may be connected to UI 604 and/or the plurality of auxiliary guide assemblies 206 via a wired connections such as ethernet, coaxial cable, universal serial bus (USB), serial (e.g., RS-232), controller area network (CAN) bus, or inter-integrated circuit (I2C) protocol, among others. In various embodiments, controller 602 may be connected to UI 604 and/or the plurality of auxiliary guide assemblies 206 by a wireless connection such as Wi-Fi, Bluetooth, Zigbee, Z-wave, or radio frequency (RF), among others.

In various embodiments, controller 602 may receive instructions from UI 604 for the plurality of auxiliary guide assemblies 206. In various embodiments, controller 602 may receive status from the plurality of auxiliary guide assemblies 206 to send to UI 604. In various embodiments, controller 602 may individually control each auxiliary guide assembly 206a, 206b, 206c, 206d, . . . , 206n. In various embodiments, controller 602 may collectively control (e.g., all at once) all of the plurality of auxiliary guide assemblies 206.

Controller 602 may be configured to receive an instruction from UI 604 to engage one or more of the plurality of auxiliary guide assemblies 206 and send a signal to engage (e.g., solenoid 220) of each of the one or more auxiliary guide assemblies 206. Controller 602 may be further configured to receive a status from one or more of the plurality of auxiliary guide assemblies 206 indicating the current state of each of the plurality of auxiliary guide assemblies 206. In various embodiments, each of auxiliary guide assemblies 206 may be in a fully retracted state, an operational state with the solenoid engaged, and an operational state with the solenoid disengaged, among others.

Controller 602 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Controller 602 may further comprise memory to store data, executable instructions, system program instructions, and/or controller instructions to implement the control logic of controller 602.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
a ball panel for moving and storing cargo; and
an auxiliary guide assembly disposed within the ball panel, the auxiliary guide assembly including:
    a hub;
    a head including a first guiding surface and a first overriding surface, the head rotatably coupled to the hub;
    a solenoid coupled to the hub and configured to receive an electric current; and
    an armature magnetically coupled to the solenoid, the armature being configured to engage the head when the armature is in an extended position.

2. The cargo handling system of claim 1, wherein the solenoid generates a magnetic field in response to receiving the electric current, the magnetic field attracting the armature, causing the armature to disengage with the head.

3. The cargo handling system of claim 2, the auxiliary guide assembly further comprising:
a torsion spring coupled to the hub and configured to raise the head when the armature is disengaged from the head.

4. The cargo handling system of claim 2, the auxiliary guide assembly further comprising:

an inner spring disposed between the solenoid and the armature, the inner spring configured to apply a force to maintain the armature in the extended position.

5. The cargo handling system of claim 1, further comprising:

a battery coupled to the solenoid, the battery providing the electric current.

6. The cargo handling system of claim 1, further comprising:

a controller connected to the auxiliary guide assembly, the controller configured to apply the electric current.

7. The cargo handling system of claim 6, wherein the controller is further configured to apply the electric current in response to an instruction received from a user interface.

\* \* \* \* \*